United States Patent
Scuderi

(10) Patent No.: US 10,774,733 B2
(45) Date of Patent: Sep. 15, 2020

(54) BOTTOMING CYCLE POWER SYSTEM

(71) Applicant: Scuderi Group, Inc., West Springfield, MA (US)

(72) Inventor: Salvatore Scuderi, Westfield, MA (US)

(73) Assignee: Scuderi Group, Inc., Westfield, MA (US)

(*) Notice: Subject to any disclaimer, the term of this patent is extended or adjusted under 35 U.S.C. 154(b) by 0 days.

(21) Appl. No.: 16/170,003

(22) Filed: Oct. 24, 2018

(65) Prior Publication Data

US 2019/0120131 A1   Apr. 25, 2019

Related U.S. Application Data

(60) Provisional application No. 62/576,964, filed on Oct. 25, 2017.

(51) Int. Cl.

| | |
|---|---|
| *F02B 39/08* | (2006.01) |
| *F01K 9/00* | (2006.01) |
| *F01K 19/04* | (2006.01) |
| *F02C 6/00* | (2006.01) |
| *F02B 41/10* | (2006.01) |
| *F02G 5/02* | (2006.01) |

(52) U.S. Cl.
CPC ............ *F02B 39/085* (2013.01); *F01K 9/003* (2013.01); *F01K 19/04* (2013.01); *F02B 41/10* (2013.01); *F02C 6/006* (2013.01); *F02G 5/02* (2013.01); *F05D 2220/764* (2013.01); *F05D 2260/10* (2013.01)

(58) Field of Classification Search
CPC ........ F02B 39/085; F02B 41/10; F02C 6/006; F01K 19/04; F01K 9/003; F05D 2220/764; F05D 2260/10; F02G 5/02
USPC ........................ 60/605.1–612; 62/238.3, 239
See application file for complete search history.

(56) References Cited

U.S. PATENT DOCUMENTS

| | | | | |
|---|---|---|---|---|
| 2,783,622 | A * | 3/1957 | Bourassa | B60H 1/3201 62/238.3 |
| 4,270,365 | A * | 6/1981 | Sampietro | B60K 13/02 62/238.3 |
| 6,321,552 | B1 * | 11/2001 | Frederiksen | B60H 1/32 123/41.23 |
| 8,020,406 | B2 * | 9/2011 | Vandor | F25J 1/0022 62/613 |

(Continued)

*Primary Examiner* — Hoang M Nguyen
(74) *Attorney, Agent, or Firm* — Heslin Rothenberg Farley & Mesiti P.C.

(57) ABSTRACT

A bottoming cycle power system includes an expander disposed on a crankshaft. The expander being operable to receive a flow of exhaust gas from a combustion process and to rotate the crankshaft as the exhaust gas passes through. An absorption chiller system has a generator section having a first heat exchanger to receive the flow of exhaust gas from the expander and to remove heat from the exhaust gas after the exhaust gas has passed through the expander. An evaporator section has a second heat exchanger to receive the flow of exhaust gas from the generator section and to remove heat from the exhaust gas after the exhaust gas has passed through the generator section. A compressor is disposed on the crankshaft and connected to the flow of exhaust gas. The compressor is operable to compress the exhaust gas after the exhaust gas has passed through the second heat exchanger.

22 Claims, 2 Drawing Sheets

(56) References Cited

U.S. PATENT DOCUMENTS

Figure 1:
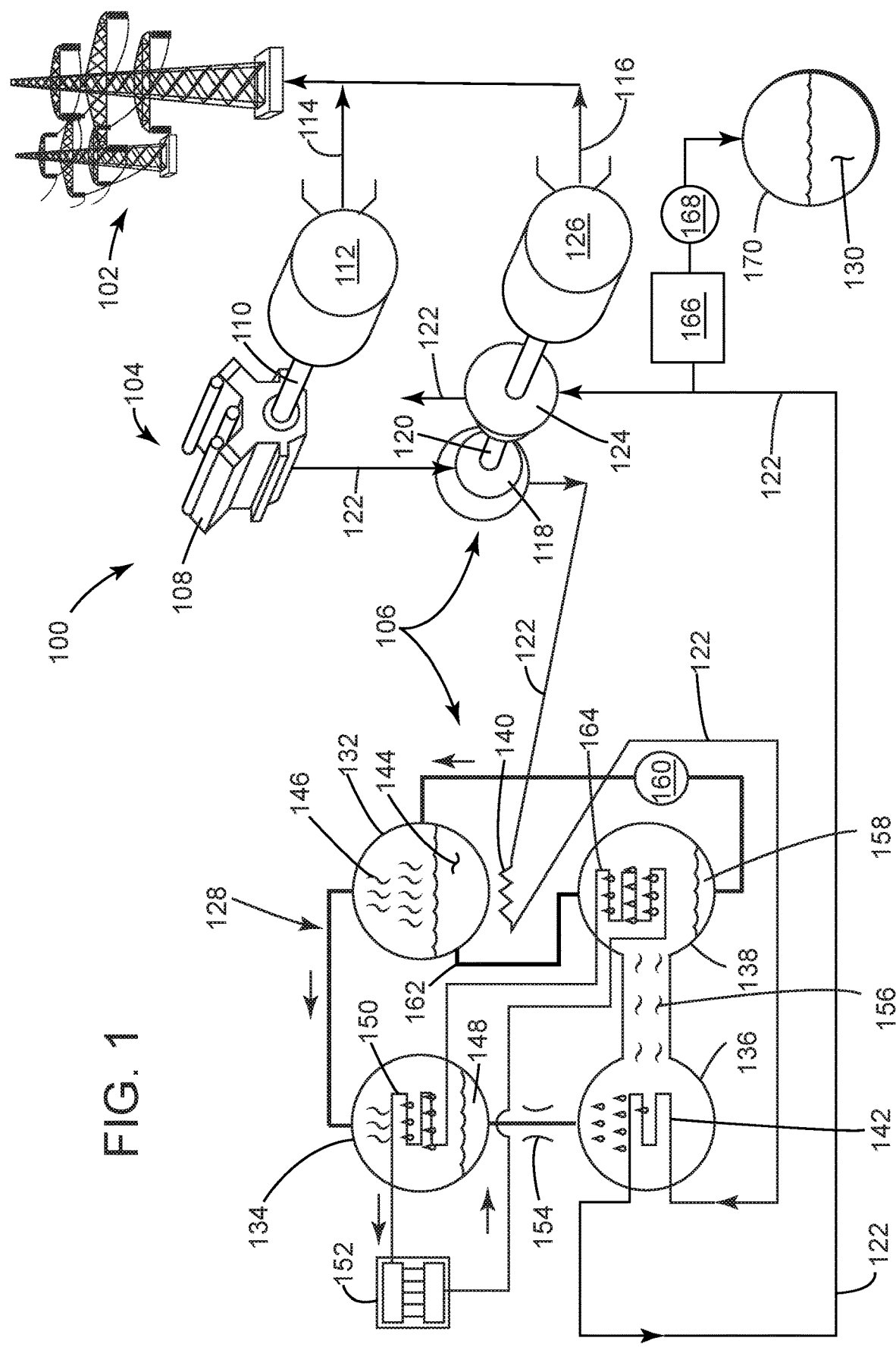

| | | | | |
|---|---|---|---|---|
| 8,141,360 B1* | 3/2012 | Huber | ................ | B60K 6/24 |
| | | | | 60/606 |
| 2007/0234721 A1* | 10/2007 | Vuk | ................ | B60K 6/24 |
| | | | | 60/608 |
| 2009/0031999 A1* | 2/2009 | Erickson | ............ | F02B 29/0443 |
| | | | | 123/563 |

* cited by examiner

BOTTOMING CYCLE POWER SYSTEM

CROSS-REFERENCE TO RELATED APPLICATION

This application claims priority to U.S. Provisional Patent Application No. 62/576,964 filed Oct. 25, 2017, and entitled "Bottoming Cycle Power System," which is incorporated by reference herein in its entirety.

TECHNICAL FIELD

The present disclosure relates to systems for delivering power. More specifically, the disclosure relates to a bottoming cycle power system for delivering power, such as mechanical or electrical power.

BACKGROUND

One of the most challenging aspects of today's energy technologies is to effectively convert waste heat from a combustion process of an internal combustion engine into useable power. Such power can be in the form of electrical or mechanical power for use in stationary and/or mobile applications.

Methods of converting waste heat into useful forms of energy are commonly referred to as bottoming cycles. Systems that utilize a bottoming cycle to provide power are referred to herein as bottoming cycle power systems.

Systems that utilize a fuel combustion process in an internal combustion engine (such as a piston engine or a turbine engine) as the motive force to drive a crankshaft for providing power are referred to herein as primary power systems. In most primary power systems the efficiency of the system ranges from below 30% to a high of almost 50%. This means that the majority of energy contained in the fuel is lost in the form of heat to the atmosphere through either the cooling circuit or exhaust of the internal combustion engine.

However, the waste energy or exhaust gas from the internal combustion engine of a primary power system may be utilized as the energy input for a bottoming cycle power system. If enough useful work can be recovered from such a bottoming cycle power system, the bottoming cycle power system could then be used to supplement the output of the primary power system for a more efficient overall system output.

One type of bottoming cycle is known as an inverted Brayton cycle. The inverted Brayton cycle typically includes an expansion turbine that receives a flow of exhaust gas from a combustion process of an internal combustion engine. The exhaust gas carries a significant amount of energy. However the flow of exhaust gas is typically only at, or slightly above, atmospheric pressure. For example, the exhaust pressure may only a few pounds per square inch (psi) above atmospheric pressure. This makes recovering useful work difficult.

In the inverted Brayton cycle, the exhaust gas flows through an expansion turbine (or expander) where it typically exits the expander at below atmospheric pressures (or vacuum pressures). The vacuum pressures are caused by a compression turbine (or compressor), which is the final step in the inverted Brayton cycle. That is, the exhaust gas enters the compressor where it is pumped back to atmospheric pressure. The amount of energy recovered from an inverted Brayton cycle is the energy produced by the expander minus the energy consumed by the compressor. Therefore, the less work needed by the compressor to compress the expanded volume of exhaust gas the higher the net-work produced from the inverted Brayton cycle.

Various prior art cooling systems can be utilized to reduce the volume of exhaust gas prior to entering the compressor in an inverted Brayton cycle and therefore, reduce the amount of work required by the compressor to compress the exhaust gas. Problematically however, these cooling systems consume a significant amount of energy due to pumps and/or other energy consuming devices needed to circulate coolants through the cooling system.

Further, the exhaust gas of an internal combustion engine contains a significant amount of water vapor as a naturally occurring by-product of the combustion process. Problematically, the water vapor has a relatively high specific volume and mass, which causes an unwanted burden on the compression work of the compressor in the inverted Brayton cycle.

Accordingly, there is a need for an inverted Brayton bottoming cycle wherein the volume of flow of exhaust gas is significantly and efficiently reduced after exiting the expander and prior to entering the compressor. More specifically, there is a need to reduce the work required of the compressor in an inverted Brayton bottoming cycle power system to increase the overall efficiency of that bottoming cycle power system. Further there is a need to efficiently decrease the volume and mass of water vapor in a flow of exhaust gas prior to entering the compressor of an inverted Brayton bottoming cycle power system.

BRIEF DESCRIPTION

The present disclosure offers advantages and alternatives over the prior art by providing a bottoming cycle power system for receiving a flow of exhaust gas from a combustion process of a primary power system. The bottoming cycle power system includes an absorption chiller system which has a generator section and an evaporator section. The generator section removes heat from the flow of exhaust gas and uses it to further cool the same flow of exhaust gas in the evaporator section to provide a two stage cooling process. Additionally the two stage cooling process may condense out water vapor from the flow of exhaust gas to significantly reduce the volume and mass of the exhaust gas.

A bottoming cycle power system in accordance with one or more aspects of the present disclosure includes an expander disposed on an expander crankshaft. The expander is operable to receive and expand a flow of exhaust gas from a combustion process. The expander is operable to rotate the expander crankshaft as the exhaust gas passes through the expander. The bottoming cycle power system also includes an absorption chiller system having a generator section and an evaporator section. The generator section has a first heat exchanger to receive the flow of exhaust gas from the expander. The generator section is operable to remove heat from the exhaust gas as the exhaust gas passes through the first heat exchanger. The evaporator section has a second heat exchanger to receive the flow of exhaust gas from the generator section. The evaporator section is operable to remove heat from the exhaust gas as the exhaust gas passes through the second heat exchanger. The bottoming cycle power system also includes a compressor disposed on the expander crankshaft and operatively connected to the flow of exhaust gas. The compressor is operable to compress the exhaust gas after the exhaust gas has passed through the second heat exchanger when the expander crankshaft is rotated by the expander.

A combined power system in accordance with one or more aspects of the present disclosure includes a primary power system and a bottoming cycle power system. The primary power system includes an internal combustion engine having a rotatable engine crankshaft. The engine is operable to use fuel in a combustion process to deliver primary power to the engine crankshaft. The combustion process produces a flow of exhaust gas. The bottoming cycle power system includes an expander disposed on a rotatable expander crankshaft. The expander is operable to receive and expand the flow of exhaust gas from the combustion process. The expander is operable to rotate the expander crankshaft as the exhaust gas passes through the expander and to deliver bottoming cycle power to the expander crankshaft. The bottoming cycle power system also includes an absorption chiller system having a generator section and an evaporator section. The generator section has a first heat exchanger to receive the flow of exhaust gas from the expander. The generator section is operable to remove heat from the exhaust gas as the exhaust gas passes through the first heat exchanger. The evaporator section has a second heat exchanger to receive the flow of exhaust gas from the generator section. The evaporator section is operable to remove heat from the exhaust gas as the exhaust gas passes through the second heat exchanger. The bottoming cycle power system also includes a compressor disposed on the expander crankshaft and operatively connected to the flow of exhaust gas. The compressor is operable to compress the exhaust gas after the exhaust gas has passed through the second heat exchanger when the expander crankshaft is rotated by the expander.

DRAWINGS

Figure 2:
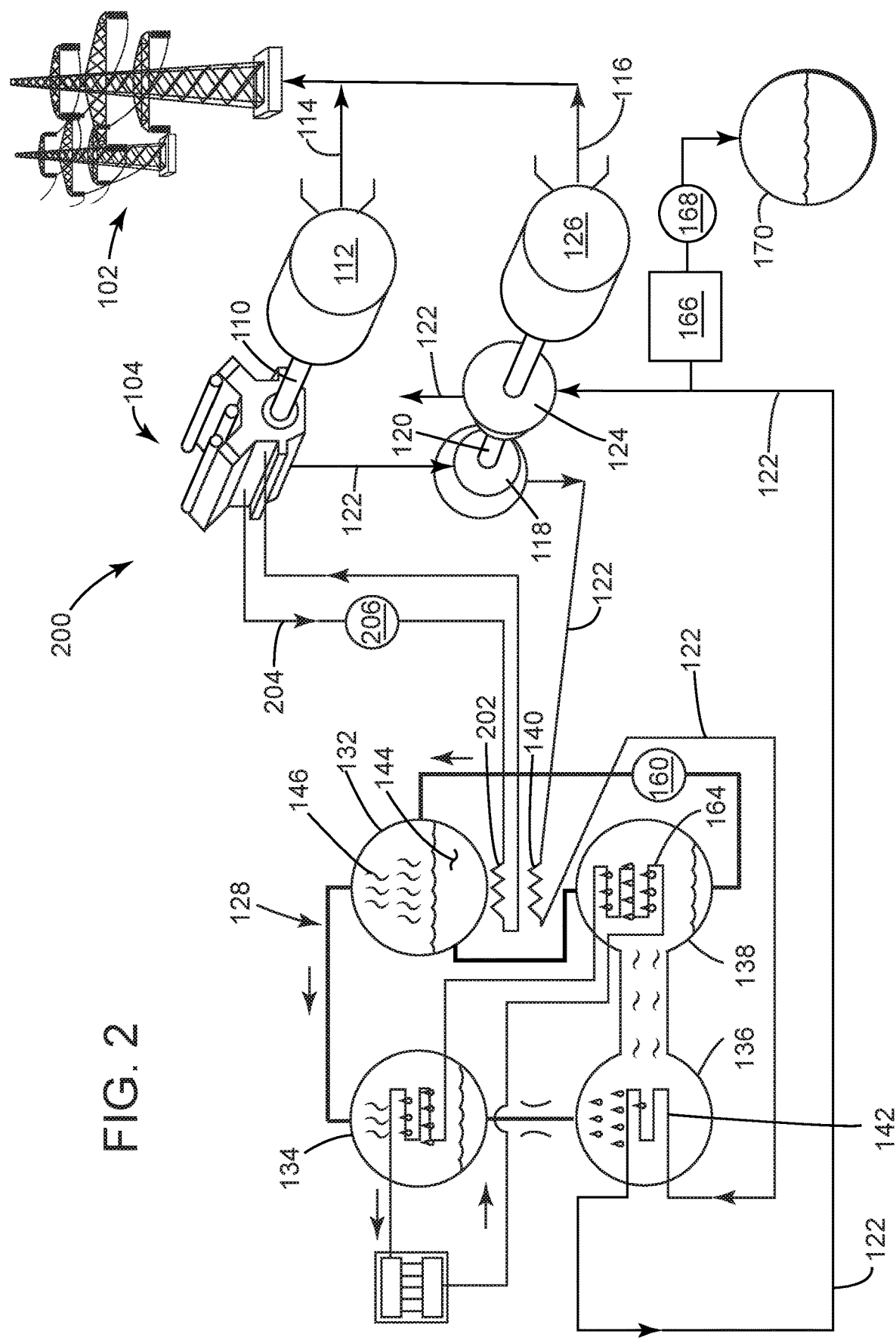

The invention will be more fully understood from the following detailed description taken in conjunction with the accompanying drawings, in which:

FIG. 1 is a schematic of an exemplary embodiment of a combined power system having a primary power system and a bottoming cycle power system in accordance with the present disclosure; and FIG. 2 is a schematic of an alternative exemplary embodiment of a combined power system having a primary power system and a bottoming cycle power system in accordance with the present disclosure.

DETAILED DESCRIPTION

Certain exemplary embodiments will now be described to provide an overall understanding of the principles of the structure, function, manufacture, and use of the methods, systems, and devices disclosed herein. One or more examples of these embodiments are illustrated in the accompanying drawings. Those skilled in the art will understand that the methods, systems, and devices specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present disclosure.

Referring to FIG. 1, a schematic of an exemplary embodiment of a combined power system 100 for generating power in accordance with the present disclosure is presented. The combined power system 100 includes a primary power system 104 and a bottoming cycle power system 106. In this embodiment, the bottoming cycle power system 106 is an inverted Brayton bottoming cycle power system 106.

Also, in this specific embodiment, the combined power system 100, primary power system 104 and bottoming cycle power system 106 are configured to generate electrical power to a grid (i.e., an interconnect network for delivering electricity from producers to consumers). However, it is within the scope of the present disclosure, that the power systems 100, 104 and 106 could be used to provide mechanical power as well.

Moreover, such power systems of the present disclosure may be used in both stationary applications and mobile applications. Examples of such stationary applications include electric generator systems for delivering electric power to a grid, electric generator systems for delivering electric power to a building, mechanical power systems for delivering mechanical power for an industrial manufacturing process or the like. Examples of such mobile applications include mechanical power systems for delivering mechanical power to a motor vehicle, electrical power systems for delivering electrical power to an electric vehicle or the like.

The primary power system 104 includes an internal combustion engine 108 having an engine crankshaft 110 that is operatively connected to a primary electric generator 112. The internal combustion engine 108 may include a turbine engine, a piston engine or similar. The engine 108 utilizes fuel in a combustion process as the motive force that rotates the engine crankshaft 110 and the primary electric generator 112 to generate a first electrical output. The first electrical output operatively conducts electric power along a first conductive path 114 to the grid 102.

Also, as will be discussed in greater detail herein, the bottoming cycle power system 106 generates a second electrical output. The second electrical output operatively conducts electric power along a second conductive path 116 to the grid 102. The first and second electrical outputs supplement each other to increase the efficiency of the combined power system 100.

The bottoming cycle power system 106 includes an expander 118 disposed on an expander crankshaft 120. The expander 118 is operable to receive and expand a flow of exhaust gas 122 from the combustion process of the internal combustion engine 108. The expander 118 is operable to rotate the expander crankshaft 120 as the exhaust gas 122 passes through the expander 118.

A compressor 124 (typically a turbine compressor or similar) is also disposed on the expander crankshaft 120. The compressor 124 is operatively connected to the flow of exhaust gas 122 and is operable to compress the exhaust gas 122 after it has passed through the expander 118. Additionally, the compressor 124 pulls a vacuum on the output side of the expander 118 to increase a pressure difference across the expander 118. The increased pressure difference enhances the expansion of the flow of exhaust gas 122 through the expander in order to convert as much energy in the exhaust gas into usable work on the expander crankshaft 120.

A bottoming cycle generator 126 is also disposed on the expander crankshaft 120. The bottoming cycle generator 126 is operable to generate electrical power when the expander crankshaft 120 is rotated by the expander 118. In other words, the bottoming cycle generator 126 generates the second electrical output of the bottoming cycle power system 106 that is conducted to the grid 102 along the second conductive path 116.

In this exemplary embodiment, the primary electric generator 112 is disposed on the engine crankshaft 110 and the bottoming cycle generator 126 is disposed on the expander crankshaft 120. Both generators 112, 126 are utilized to deliver electric power. However, it is within the scope of the present disclosure to replace the primary electric generator 112 and the bottoming cycle generator 126 with alternative mechanical systems disposed on the engine crankshaft 110 and the expander crankshaft 120 for delivering mechanical power. For example, a system of gears or a transmission system disposed on the engine crankshaft 110 and the expander crankshaft 120 may be utilized to drive machinery in a stationary industrial application or a motor vehicle in a mobile application.

The bottoming cycle power system 106 also includes an absorption chiller system 128 to provide a unique two stage cooling process on the flow of exhaust gas 122. The two stage cooling process reduces the volume of exhaust gas 122 prior to entering the turbine compressor 124, therefore significantly reducing the amount of work that the compressor 124 has to perform on the exhaust gas 122.

Additionally, in some embodiments, the cooling process of the absorption chiller system 128 reduces the temperature of the exhaust gas below a condensation temperature of water vapor dispose in the exhaust gas 122. As such the water vapor condenses out of the exhaust gas 122 in the form of condensed water 130 before the exhaust gas 122 enters the compressor 124. This also significantly reduces both the mass and volume of the flow of exhaust gas 122, which further reduces work required of the compressor 124 and increases the overall efficiency of the bottoming cycle power system 106.

Further, as will be described in greater detail herein, the two stage cooling process of this absorption chiller system 128 uniquely utilizes the heat removed from the flow of exhaust gas 122 in the first stage to cool the same flow of exhaust gas 122 in the second stage. That is, the heat removed from the flow of exhaust gas 122 in the first stage provides the motive force that drives refrigerant into the second stage to cool the same flow of exhaust gas a second time.

More specifically, the absorption chiller system 128 includes four main sections. They are a generator section 132, a condenser section 134, an evaporator section 136 and an absorber section 138.

The two stage cooling process of the exhaust gas 122 is performed in the generator section 132 and the evaporator section 136. More specifically, the generator section 132 includes a first heat exchanger 140 to receive the flow of exhaust gas 122 from the expander 118. The generator section 132 is operable to remove heat from the exhaust gas 122 as the exhaust gas passes through the first heat exchanger 140. The output of the first heat exchanger 140 of generator section 132 is in fluid communication with the input of a second heat exchanger 142 of the evaporator section 136. Therefore, once the exhaust gas passes through the generator section 132, it flows into the evaporator section 136.

The evaporator section 136 includes the second heat exchanger 142 to receive the flow of exhaust gas 122 from the generator section 132. The evaporator section 142 is operable to remove heat from the exhaust gas 122 as the exhaust gas passes through the second heat exchanger 142. The output of the second heat exchanger 142 of evaporator section 136 is in fluid communication with the input of the turbine compressor 124. Therefore, once the exhaust gas passes through the evaporator section 136, it flows into the compressor 124 where it is compressed back to atmospheric pressure and released to the atmosphere.

The first and second heat exchangers 140, 142 in this embodiment are simple coils of tubing that funnel the exhaust gas through the generator section 132 and evaporator section 136 in sequence. The heat of the exhaust gas 122 is then transferred directly from the first and second heat exchangers 140, 142 into the generator section 132 and the evaporator section 136 respectively.

However, it is within the scope of the present disclosure that the first and second heat exchanges 140, 142 may also be other configurations as well. For example, the heat exchangers 140, 142 may be more complex heat exchanger systems, which may utilize coolant pumps to circulate chilled water (or other coolant) between the exhaust gas 122 and the generator section 132 and/or the evaporator section 136. The chilled water could then remove the heat from the exhaust gas 122 and transfer it indirectly into the generator section 132 and/or evaporator section 136.

During operation, the exhaust gas 122 from the internal combustion engine 108 enters and expands in the expander 118. By way of example, the exhaust gas could enter the expander at about 700 to 900 degrees Fahrenheit (F) and about 10 psi above atmospheric pressure. By doing so, the exhaust gas 122 does work by initiating rotation of the expander crankshaft 120 which rotates the turbine compressor 124 and the bottoming cycle generator 126. Rotation of the turbine compressor 124 results in a vacuum (for example, 10 psi below atmospheric pressure) being pulled on the exhaust gas 122 as it passes through the expander 118.

The exhaust gas 122 then flows into the first heat exchanger 140 of the absorption chiller system 128. The exhaust gas 122 has cooled somewhat due to the work it has performed on the expander crankshaft 120. For example, the exhaust gas 122 could be at about 400 to 600 degrees F. as it enters the generator section 132.

As the exhaust gas 122 passes through the first heat exchanger 140 it transfers heat into the generator section 132 and cools even further. For example, the exhaust gas 122 could cool to about 100 to 300 degrees F. as it flows out of the generator section 132 and into the second heat exchanger 142 of the evaporator section 136.

The heat removed from the exhaust gas 122 by the generator section 132 boils a first refrigerant solution 144 to produce a first flow of steam 146 in the generator section 132. The first refrigerant solution 144 is generally a solution of salt and water or a solution of ammonia and water, although other refrigerant solutions that meet the thermodynamic requirements of the absorption chiller system 128 can also be used. In this specific embodiment, the first refrigerant solution 144 is a brine solution of lithium bromide and water.

Once the first flow of steam 146 has evaporated out of the first refrigerant solution 144, it flows into the condenser section 134 of the absorption chiller system 128. The condenser section 134 and generator section 132 are almost always located above the evaporator section 136 and absorber section 138 of the absorption chiller system 128. The condenser section 134 and generator section 132 are also maintained at approximately the same pressure, which is a higher pressure than the evaporator section 136 and absorber section 138. For example, the condenser and generator sections 134, 132 are often maintained within a range of about atmospheric pressure (i.e., 14.7 pounds per square inch absolute (psia)) to a vacuum pressure of about 4.9 psia. Whereas the evaporator and absorber sections are often maintained at a pressure of about 0.12 psia or lower.

The condenser section 134 is operable to remove heat from the first flow of steam 146 and condense the steam into a flow of liquid water 148. More specifically in this embodiment, the condenser section 134 includes a set of condenser cooling coils 150 that are in fluid communication with chilled water from a cooling tower 152. The cold condenser cooling coils 150 condense the steam 146 into the liquid water 148, which collects at the bottom of the condenser section 134.

Though a cooling tower 152 is used in this embodiment to cool at least the condensing coils 150 in the condenser section 134, it is within the scope of the present disclosure to use other types of cooling systems as well. For example, in a mobile vehicle application, a vehicle's cooling system may be utilized to remove heat from the cooling coils 150 and reject that heat through the vehicle's radiator. Additionally, in a stationary application, a variety of well-known stationary heat exchanger systems may be used to remove the heat from at least the cooling coils 150.

The evaporator section 136 is in fluid communication with the liquid water 148 such that the liquid water 148 flows from the condenser section 134 through an orifice 154 (or other types of a variety of well-known pressure regulating devices) and into the evaporator section 136. The orifice provides and maintains a pressure differential between a first pressure of the condenser section 134 and a second lower pressure of the evaporator section 136. More specifically for this embodiment, the condenser section 134 may be at a vacuum pressure of about 4.9 psia where water boils at about 158 degrees F. and the evaporator section 136 may be at a much deeper vacuum pressure of about 0.12 psia where water boils at about 40 degrees F.

The pressure difference between the condenser section 134 and evaporator section 136 flash cools the liquid water 148 as it enters the evaporator, which is sprayed across the second heat exchanger 142. The liquid water 148 then removes heat from the much hotter exhaust gas 122 which is passing through the second heat exchanger 142.

Accordingly, the flow of liquid water 148 from the condenser section 134 is evaporated in the lower pressure evaporator section 136 to produce a second flow of steam 156, which flows from the generator section 136 to the absorber section 138. Further the exhaust gas 122 is cooled a second time in the evaporator section 136. By way of example, since the liquid water 148 can boil at about 40 degrees F. in the low pressure evaporator section 136, the exhaust gas 122 may be further cooled down to about 45 to 50 degrees F. before it flows out of the evaporator section 142 and into the turbine compressor 124.

The absorber section 138 is in fluid communication with the second flow of steam 156 from the evaporator section 136. Additionally, the absorber section 138 contains a second refrigerant solution 158. The second refrigerant solution 158 has the same molecular composition as the first refrigerant solution 144, but has a different percentage of water.

The lithium bromide (or salt) in the second refrigerant solution 158 has a strong chemical attraction for the second flow of steam 156 as the water and salt naturally tend to combine in the absorber section 138. The attraction is so great, that it helps to maintain the near total vacuum pressures of about 0.12 psia in the evaporator and absorber sections 136, 138.

A solution pump 160 is in fluid communication with the first refrigerant solution 144 and the second refrigerant solution 158. The solution pump 160 is operable to pump the second refrigerant solution 158 in the absorber section 138 to the first refrigerant solution 144 in the generator section 132.

Additionally in this embodiment, the first refrigerant solution 144 is gravity fed through tubing 162 back down to the absorber section 138, where it is spayed on absorber cooling coils 164 that are disposed within the absorber section 138. The absorber cooling coils 164 are also cooled, in this embodiment, by chilled water from the cooling tower 152 and are used to condense the second flow of steam 156 back into liquid water which readily combines with the second refrigerant solution 158 to complete a refrigerant solution circuit and the cooling cycle of the absorption chiller system 128.

It is important to note that, by flowing the exhaust gas through the first heat exchanger 140 of the generator section 132 and then sequentially flowing the same exhaust gas through the second heat exchanger 142 of the evaporator section 136, the heat removed from the exhaust gas 122 in the generator section 132 is used to cool the exhaust gas 122 in the evaporator section 136. More specifically, the heat energy removed from the exhaust gas 122 in the generator section 132 evaporates a refrigerant (i.e., water in its various states 146, 148 and 156 or the like) and provides the motive force to drive that refrigerant through the entire cooling cycle of the absorption chiller system 128. That refrigerant is utilized to uniquely cool the exhaust gas 122 for a second time as it passes through the evaporator section 136.

Advantageously, this two stage process of cooling the exhaust gas 122 requires very little energy consuming prime moving devices (such as liquid pumps or similar) to circulate the refrigerant. Therefore, by the time the exhaust gas 122 has reached the compressor 124, the work required by the compressor to compress the exhaust gas 122 back to atmospheric pressures has been significantly reduced at very little cost in terms of energy required to provide the two stage cooling process. Accordingly, the net power that can be generated by the bottoming cycle generator 126 is significantly enhanced.

It is also important to note that the exhaust gas 122 will always have a significant component (for example between 5 and 10 percent by mass) of water vapor in it as a natural by-product of the combustion process. Because of the large specific volume and specific mass of water vapor, the water vapor has a major impact on the overall volume and mass of the exhaust gas 122 (for example between about 10 and 15 percent by volume and between about 5 to 10 percent by mass).

Advantageously, the evaporator section 136 is operable to reduce the temperature of the flow of exhaust gas 122 below a condensation temperature of water vapor disposed in the exhaust gas 122 such that the water vapor condenses out of the exhaust gas before the exhaust gas enters the compressor 124. For example, if the evaporator section 136 is at a reduced pressure of 0.12 psia, the refrigerant water 148 boils at about 40 degrees F. Accordingly the absorption chiller system 128 can be sized to provide an exhaust gas 122 temperature of about 45 to 50 degrees F. as it exits the evaporator section 136.

Condensing the bulk of the water vapor out of the exhaust gas 122 greatly reduces the mass and volume of the flow of the exhaust gas 122. For example, the mass of the exhaust gas can be reduced by at least 5 to 10 percent when the water vapor is condensed out of the exhaust gas in the evaporator section of the absorption chiller. This can reduce the volume of the exhaust gas by at least 10 to 15 percent. Both the reduction of mass and volume of the exhaust gas 122 greatly reduces the amount of work that the compressor 124 has to do and greatly increase the efficiency of the bottoming cycle power system 106.

The condensed water content of the exhaust gas 122 may be extracted from the flow of exhaust gas 122 by a water separator system 166 prior to the exhaust gas 122 entering the turbine compressor 124. A water pump 168 can then pump the water back to atmospheric pressure and into a tank 170 where the condensed water 130 can collect.

Referring to FIG. 2, a schematic of an alternative exemplary embodiment of a combined power system 200 for generating electric power in accordance with the present disclosure is presented. The combined power system 200 is substantially the same as the combined power system 100 of FIG. 1, accept for the addition of a third heat exchanger 202 in the generator section 132 that is in fluid communication with engine liquid coolant 204 from engine 108.

A significant amount of waste heat is removed from engine 108 though liquid coolant 204 as well as through its exhaust gas 122. The liquid coolant 204 can be pumped via liquid coolant pump 206 from the engine 108 to the generator section 132.

In this alternative embodiment of the combined power system 200, the generator section 132 of the absorption chiller 128 has a third heat exchanger 202 that is connected to a flow of liquid coolant 204 from the engine 108 of the primary power system 104. The generator section 132 is operable to remove heat from the liquid coolant 204 as it passes through the third heat exchanger 202. The heat removed from the liquid coolant 204 then supplements the heat removed from the flow of exhaust gas 122 to boil the first refrigerant solution 144 in the generator section 132.

For example, the temperature of the liquid coolant 204, may only be about 180 to 200 degrees F. However, since the generator section 132 is under a vacuum pressure of about 4.9 psia, the water in the first refrigerant solution 144 will boil at about 158 degrees F. Therefore, the temperature of the liquid coolant 204 is sufficient to produce at least a portion of the first flow of steam 146 that will be used as a refrigerant to cool the exhaust gas 122 in the evaporator section 136.

The amount of heat energy from liquid coolant 204 can be significant. This is especially the case when the internal combustion engine is a piston internal combustion engine (piston engine) as opposed to a turbine internal combustion engine (turbine engine). In a piston engine, the heat removed by the liquid coolant 204 can equal or exceed the heat removed from the exhaust gas 122.

The additional heat energy from the liquid coolant 204 can supplement the overall heat energy driving the absorption chiller system 128 to further reduce the temperature of the exhaust gas 122 in the evaporator section 136. Additionally, the additional heat energy from the liquid coolant 204 can be utilized to condense more water vapor out of the exhaust gas 122 in the evaporator section 136.

In this embodiment, the third heat exchanger 202 is a set of cooling coils. However, it is within the scope of the present disclosure that the third heat exchanger 202 may also be other configurations as well. For example, the third heat exchanger 202 may be a more complex heat exchanger system, which may utilize coolant pumps to circulate chilled water (or other coolant) between the liquid coolant 204 and the generator section 132. The chilled water could then remove the heat from the liquid coolant 204 and transfers it indirectly into the generator section 132.

A list of bottoming cycle power system reference numbers is provided herein:

FIG. 1
100 combined power system (FIG. 1)
102 grid
104 primary power system
106 bottoming cycle power system
108 internal combustion engine
110 engine crankshaft
112 primary electric generator
114 first conductive path
116 second conductive path
118 turbine expander
120 expander crankshaft
122 exhaust gas
124 turbine compressor
126 bottoming cycle generator
128 absorption chiller system
130 condensed water
132 generator section
134 condenser section
136 evaporator section
138 absorber section
140 first heat exchanger
142 second heat exchanger
144 concentrated refrigerant solution
146 first flow of steam
148 liquid water
150 condenser cooling coils
152 cooling tower
154 orifice
156 second flow of steam
158 dilute refrigerant solution
160 solution pump
162 tubing between generator and absorber
164 absorber cooling coils
166 water separator system
168 water pump
170 water tank
FIG. 2
200 alternative embodiment of combined power system (FIG. 2)
202 third heat exchanger
204 liquid coolant
206 liquid coolant pump Although the invention has been described by reference to specific embodiments, it should be understood that numerous changes may be made within the spirit and scope of the inventive concepts described. Accordingly, it is intended that the invention not be limited to the described embodiments, but that it have the full scope defined by the language of the following claims.

What is claimed is:

1. A bottoming cycle power system comprising:
an expander disposed on an expander crankshaft, the expander operable to receive and expand a flow of exhaust gas from a combustion process, the expander operable to rotate the expander crankshaft as the exhaust gas passes through the expander;
an absorption chiller system having:
a generator section having a first heat exchanger to receive the flow of exhaust gas from the expander, the generator section operable to evaporate a refrigerant to remove heat from the exhaust gas as the exhaust gas passes through the first heat exchanger, and
an evaporator section having a second heat exchanger to receive the flow of exhaust gas from the generator section, the evaporator section operable to remove heat from the exhaust gas as the exhaust gas passes through the second heat exchanger by re-evaporating the same refrigerant that was evaporated in the generator section; and a compressor disposed on the expander crankshaft and operatively connected to the flow of exhaust gas, the compressor operable to compress the exhaust gas after the exhaust gas has passed through the second heat exchanger when the expander crankshaft is rotated by the expander.

2. The bottoming cycle power system of claim 1 comprising a bottoming cycle generator disposed on the expander crankshaft, the bottoming cycle generator operable to generate electrical power when the expander crankshaft is rotated by the expander.

3. The bottoming cycle power system of claim 1 comprising the evaporator section operable to reduce the temperature of the flow of exhaust gas below a condensation temperature of water vapor disposed in the exhaust gas such that the water vapor condenses out of the exhaust gas before the exhaust gas enters the compressor.

4. The bottoming cycle power system of claim 1 wherein the heat removed from the exhaust gas in the generator section evaporates a refrigerant that is used to cool the exhaust gas in the evaporator section.

5. The bottoming cycle power system of claim 1 wherein the heat removed from the exhaust gas by the generator section boils a first refrigerant solution to produce a first flow of steam in the generator section.

6. The bottoming cycle power system of claim 5 wherein the first refrigerant solution is one of a solution of salt and water and a solution of ammonia and water.

7. The bottoming cycle power system of claim 5 wherein the absorption chiller system includes a condenser section in fluid communication with the first flow of steam from the generator section, the condenser section operable to remove heat from the steam and condense the steam into a flow of liquid water.

8. The bottoming cycle power section of claim 7 wherein the absorption chiller system comprises:
the evaporator section being in fluid communication with the flow of liquid water from the condenser section through an orifice, the orifice providing a pressure differential between a first pressure of the condenser section and a second lower pressure of the evaporator section; and
wherein the heat remove from the flow of exhaust gas by the evaporator section evaporates the flow of liquid water from the condenser section to produce a second flow of steam in the evaporator section.

9. The bottoming cycle power section of claim 8 wherein the absorption chiller system comprises:
an absorber section in fluid communication with the second flow of steam from the evaporator section, the absorber section containing a second refrigerant solution; and
wherein the second flow of steam is absorbed into the second refrigerant solution in the absorber section.

10. The bottoming cycle power section of claim 9 wherein the absorption chiller system comprises:
a solution pump in fluid communication with the first and second refrigerant solutions, the solution pump operable to pump the second refrigerant solution in the absorber section to the first refrigerant solution in the generator section.

11. The bottoming cycle power system of claim 1 wherein the flow of exhaust gas is from a combustion process of a primary power system.

12. The bottoming cycle power system of claim 11 comprising:
the generator section having a third heat exchanger being connected to a flow of liquid coolant from the primary power system, the generator section operable to remove heat from the liquid coolant as it passes through the third heat exchanger; and
wherein the heat removed from the liquid coolant supplements the heat removed from the flow of exhaust gas to boil the first refrigerant solution in the generator section.

13. The bottoming cycle power system of claim 3 wherein a mass flow of the exhaust gas is reduce by at least 5 percent when the water vapor is condensed out of the exhaust gas in the evaporator section of the absorption chiller.

14. The bottoming cycle power system of claim 3 wherein a mass flow of the exhaust gas is reduce by at least 10 percent when the water vapor is condensed out of the exhaust gas in the evaporator section of the absorption chiller.

15. The bottoming cycle power system of claim 3 wherein a volume flow of the exhaust gas is reduce by at least 10 percent when the water vapor is condensed out of the exhaust gas in the evaporator section of the absorption chiller.

16. The bottoming cycle power system of claim 3 wherein a volume flow of the exhaust gas is reduce by at least 15 percent when the water vapor is condensed out of the exhaust gas in the evaporator section of the absorption chiller.

17. A combined power system comprising:
a primary power system including an internal combustion engine having a rotatable engine crankshaft, the engine operable to use fuel in a combustion process to deliver primary power to the engine crankshaft, the combustion process producing a flow of exhaust gas; and
a bottoming cycle power system including:
an expander disposed on a rotatable expander crankshaft, the expander operable to receive and expand the flow of exhaust gas from the combustion process, the expander operable to rotate the expander crankshaft as the exhaust gas passes through the expander and to deliver bottoming cycle power to the expander crankshaft,
an absorption chiller system having:
a generator section having a first heat exchanger to receive the flow of exhaust gas from the expander, the generator section operable to evaporate a refrigerant to remove heat from the exhaust gas as the exhaust gas passes through the first heat exchanger, and
an evaporator section having a second heat exchanger to receive the flow of exhaust gas from the generator section, the evaporator section operable to remove heat from the exhaust gas as the exhaust gas passes through the second heat exchanger by re-evaporating the same refrigerant that was evaporated in the generator section, and
a compressor disposed on the expander crankshaft and operatively connected to the flow of exhaust gas, the compressor operable to compress the exhaust gas after the exhaust gas has passed through the second heat exchanger when the expander crankshaft is rotated by the expander.

18. The combined power system of claim 17 comprising:
a primary electric generator disposed on the engine crankshaft for delivering electric power;
a bottoming cycle generator disposed on the expander crankshaft for delivering electric power; and wherein the electric power from the primary electric generator and the electric power from the bottoming cycle generator combine to provide the total power output of the combined power system.

19. The combined power system of claim 17 comprising the evaporator section operable to reduce the temperature of the flow of exhaust gas below a condensation temperature of water vapor disposed in the exhaust gas such that the water vapor condenses out of the exhaust gas before the exhaust gas enters the compressor.

20. The combined power system of claim 17 wherein the heat removed from the exhaust gas in the generator section evaporates a refrigerant that is used to cool the exhaust gas in the evaporator section.

21. The bottoming cycle power system of claim 1, wherein the compressor pulls a vacuum on the output side of the expander to increase a pressure difference across the expander.

22. The combined power system of claim 17, wherein the compressor pulls a vacuum on the output side of the expander to increase a pressure difference across the expander.

* * * * *